United States Patent
Gaudreault

(10) Patent No.: US 12,112,581 B2
(45) Date of Patent: Oct. 8, 2024

(54) SYSTEM AND METHOD FOR REMOTE DIAGNOSTICS AND MONITORING OF HEAVY EQUIPMENT

(71) Applicant: Daniel Gaudreault, Summerville, SC (US)

(72) Inventor: Daniel Gaudreault, Summerville, SC (US)

( * ) Notice: Subject to any disclaimer, the term of this patent is extended or adjusted under 35 U.S.C. 154(b) by 780 days.

(21) Appl. No.: 16/540,815

(22) Filed: Aug. 14, 2019

(65) Prior Publication Data
US 2020/0058173 A1    Feb. 20, 2020

Related U.S. Application Data

(60) Provisional application No. 62/718,775, filed on Aug. 14, 2018.

(51) Int. Cl.
| | |
|---|---|
| G07C 5/00 | (2006.01) |
| G06F 8/65 | (2018.01) |
| G06Q 10/0631 | (2023.01) |
| G07C 5/08 | (2006.01) |
| G07C 5/12 | (2006.01) |

(52) U.S. Cl.
CPC ............ G07C 5/008 (2013.01); G06F 8/65 (2013.01); G06Q 10/063112 (2013.01); G07C 5/085 (2013.01); G07C 5/12 (2013.01)

(58) Field of Classification Search
CPC .......... G07C 5/008; G07C 5/085; G07C 5/12; G07C 5/0825; G06F 8/65; G06Q 10/063112; G06Q 10/20
See application file for complete search history.

(56) References Cited

U.S. PATENT DOCUMENTS

| | | | |
|---|---|---|---|
| 5,400,018 A | * | 3/1995 | Scholl ............... G08G 1/20 340/10.3 |
| 6,662,091 B2 | | 12/2003 | Wilson et al. |
| 7,155,321 B2 | | 12/2006 | Bromley et al. |
| 7,532,962 B1 | | 5/2009 | Lowrey et al. |
| 7,904,219 B1 | | 3/2011 | Lowrey et al. |
| 8,019,501 B2 | | 9/2011 | Breed |
| 8,190,322 B2 | | 5/2012 | Lin et al. |
| 8,285,439 B2 | | 10/2012 | Hodges |
| 9,224,249 B2 | | 12/2015 | Lowrey et al. |
| 9,384,599 B2 | | 7/2016 | Chen et al. |

(Continued)

*Primary Examiner* — Abby J Flynn
*Assistant Examiner* — Paulo Roberto Gonzalez Leite
(74) *Attorney, Agent, or Firm* — Southeast IP Group, LLC; Thomas L. Moses

(57) ABSTRACT

A system for remotely monitoring and diagnosing equipment malfunctions includes, broadly, a sensor array that is operatively attached to an on-board computer or computing device. The computing device gathers information from the sensor array in real time and continuously displays the results and measurements of the various sensors. A communications module is operatively connected to the on-board computer, and is used to transmit the information gathered by the sensors to another computing device at a remote location, which is typically a technical support facility manned and operated by technicians who are qualified to monitor the performance of the various systems, use the information to diagnose problems and malfunctions, and provide solutions to fix the problems and malfunctions.

18 Claims, 3 Drawing Sheets

(56) References Cited

U.S. PATENT DOCUMENTS

| | | | |
|---|---|---|---|
| 9,513,789 B2 | 12/2016 | Marshall et al. | |
| 10,063,810 B2 * | 8/2018 | Zhou | H04N 7/147 |
| 2003/0060953 A1 * | 3/2003 | Chen | G07C 5/085 |
| | | | 701/31.4 |
| 2003/0093203 A1 * | 5/2003 | Adachi | E02F 9/267 |
| | | | 701/50 |
| 2003/0095038 A1 * | 5/2003 | Dix | G07C 5/008 |
| | | | 340/425.5 |
| 2004/0138790 A1 * | 7/2004 | Kapolka | G06Q 10/08 |
| | | | 701/29.3 |
| 2005/0240343 A1 * | 10/2005 | Schmidt, II | G07C 5/085 |
| | | | 701/1 |
| 2010/0042287 A1 | 2/2010 | Zhang et al. | |
| 2011/0130905 A1 * | 6/2011 | Mayer | G07C 5/008 |
| | | | 340/439 |
| 2012/0041637 A1 * | 2/2012 | Allemang | G07C 5/085 |
| | | | 701/31.5 |
| 2012/0194679 A1 * | 8/2012 | Nehowig | G07C 7/00 |
| | | | 348/148 |
| 2016/0171791 A1 * | 6/2016 | Cervantes | G07C 5/0808 |
| | | | 701/31.5 |

* cited by examiner

Figure 1

```
providing a heavy mobile equipment unit having a sensor array including multiple sensors for monitoring
component systems, connected to an onboard computing device that includes a video screen, at least one
speaker, a microphone, a camera and a transmitter and receiver capable of sending and receiving data
communications and audio/video communications;
```
↓
```
providing remote computing device including a video screen, at least one speaker, a microphone, a
camera and a transmitter and receiver capable of sending and receiving data communications and
audio/video communications with the onboard computing device, wherein the remote computing device
receives real-time data from the onboard computing device;
```
↓
```
programming the onboard computing device and the remote computing device with parameters for
acceptable performance by the component systems, to trigger an alert notification
```
↓
```
providing a docking station on the heavy mobile equipment unit for removably receiving the onboard
computing device.
```
↓
```
having a technician monitor the remote computing device to detect the alert notifications;
```
↓
```
having the technician communicate with a user of the heavy mobile equipment unit using audio and
video communications to determine a course of action to repair the component system that is operating
outside of the acceptable parameters.
```
↓
```
having the user of the heavy mobile equipment unit remove the onboard computing device from the
docking station and use the computing device to take and send a video and/or a picture of portions of any
the component system to the remote computing device for inspection by the technician.
```
↓
```
having the technician determine if any of the component systems of the heavy mobile equipment unit
requires a new part and arranging for the part to be shipped to the user's location; and further
determining whether the new part will require a mechanic to install the new part onto the heavy mobile
equipment unit; and if so using the remote computing device to arrange for a mechanic to travel to the
location where the heavy mobile equipment is located in order to install the new part.
```
↓
```
using the remote computing device to send software updates or software patches to the onboard
computing device.
```

Figure 2

SYSTEM AND METHOD FOR REMOTE DIAGNOSTICS AND MONITORING OF HEAVY EQUIPMENT

BACKGROUND OF THE INVENTION

Field of the Invention

The present invention relates generally to systems and methods for remotely monitoring heavy equipment, and remotely diagnosing problems and issues that occur, in real time. More specifically, the present invention includes a system comprising, in a broad embodiment, heavy mobile equipment (such as a brush cutter, excavator, backhoe, or other mobile heavy equipment) having sensor array for monitoring various on-board systems, an on-board computing device operatively connected to the sensor array, an on-board communications module for communicating with a remote service department, manufacturer and/or technician using a centralized computing device with means for communicating with the on-board computer.

Background

Traditionally, in the field of heavy industrial equipment such as brush cutters, farm equipment, backhoes and other types of heavy mobile equipment, the business model works as follows: Manufacturers contract with a number of dealers, who are spread out around the country. The dealers purchase brush cutters (for instance) from the manufacturer, mark up the price, and sell the brush cutters to customers. The manufacturer usually offers a warranty on the brush cutters for some period of time, and when a brush cutter breaks down due to a mechanical failure, electrical failure, hydraulic issue, or the like, then the customer must bring the brush cutter back to one of the dealers for repair.

Oftentimes, the job site where the brush cutter is located when the breakdown occurs is in a remote area, far from the location of the nearest dealer. Thus, getting the brush cutter back to a dealer requires loading it up on a trailer and hauling it for a significant distance, and dropping it off to be diagnosed and repaired, which can take a considerable amount of time. Of course, these types of delays are usually costly for the customer, because such a delay not only causes missed deadlines on the current project, but many times causes a delay in future projects, as well. In other words, time is money.

After the broken down brush cutter has been delivered to a dealership, the service department diagnoses the problem, and if replacement parts are required for the repairs, then the parts are ordered from the manufacturer. Then, the brush cutter sits idle at the dealership until the parts arrive. After the parts have been delivered and repairs are made, then the customer must haul a trailer back to the dealership to retrieve the brush cutter, and then haul the brush cutter back to the job site. This process can take up an enormous amount of time (possibly several weeks), during which time the customer is losing money, and the project is delayed.

If the repair work is covered by the manufacturer's warranty, then the dealer sends an invoice to the manufacturer for payment. Unfortunately for the manufacturer, the labor costs are often calculated on an hourly basis, so the dealership mechanics are not incentivized to work quickly and efficiently.

Therefore, it would be desirable to provide a system and method whereby the manufacturer could monitor various systems on the brush cutter in real time and provide diagnostic services remotely in the event of a malfunction, while the brush cutter is located at the job site. Further, it would be advantageous for the manufacturer to send replacement parts directly to the customer/operator in the field for repair, which also saves time and money.

In the past, attempts have been made to provide systems capable of providing remote monitoring and/or diagnostics of different types of machinery. The following examples and references are incorporated herein by reference:

U.S. Pat. No. 6,662,091—Diagnostic/Prognostics Using Wireless Links

A system and method for monitoring operating parameters of a machine (such as a vehicle) and producing diagnostic and/or prognostic results are disclosed. Active, semi-active, or semi-passive sensors are wirelessly linked with an interrogator that selectively interrogates the sensors, such as through transponders in wired communication with the sensors. A data concentrator or processor analyzes data from certain sensors and generates diagnostic/prognostic conclusions, in some cases using additional data selectively requested from and acquired by the sensors. In some embodiments, raw or abstracted data is communicated with a management center that provides troubleshooting information (again, possibly using additional, selectively acquired data), makes resource management decisions (such as preparing parts or labor resources to make a repair), and tracks problems in all or a subset of the machines being managed.

U.S. Pat. No. 7,155,321—System, Method and Computer Program Product for Remote Vehicle Diagnostics, Monitoring, Configuring and Reprogramming A remote vehicle diagnostics, monitoring, configuration and reprogramming tool is provided. The system includes a fleet of vehicles equipped with wireless mobile communications means that enable fleet managers to remotely diagnose, monitor and reprogram vehicles in their fleet via an Internet Web-based browser environment. Each vehicle within the fleet is equipped with a smart device that is coupled to the data bus within each vehicle. Date commands relating to the vehicle's parameters (e.g., diagnostic parameters such as max road speed, engine RPM, coolant temperature, air inlet temperature, etc.) are sent and received using satellite and terrestrial wireless communications technology. The invention allows users to remotely perform total fleet logistics and eliminates (or reduces) the need to physically bring fleet vehicles to a repair, maintenance or configuration facility.

U.S. Pat. No. 7,532,961—Internet-Based Vehicle Diagnostic System

The invention provides a system for monitoring a vehicle that includes a wireless appliance in electrical contact with an in-vehicle computer. The wireless appliance features: 1) a data-collection component that supports communication software that collects diagnostic data from the computer; and 2) a data-transmission component, in electrical communication with the data-collection electronics, configured to transmit an outgoing data packet comprising the diagnostic data over a network and receive over the same network an incoming data packet that modifies the communication software. The wireless appliance communicates with a host computer system that is configured to: 1) receive the outgoing data packet from the network; 2) process the outgoing data packet to generate a set of vehicle diagnostic data; 3) host a web site on the Internet that displays the vehicle diagnostic data; and 4) send out the incoming data packet over the same network to modify the communication software.

U.S. Pat. No. 7,904,219—Peripheral Access Devices and Sensors for Use with Vehicle Telematics Devices and Systems A telematics system is disclosed including a telematics device with a controller in communication with a diagnostic system configured to receive diagnostic information from a host vehicle; a position-locating system configured to determine location information of the host vehicle; a wireless transceiver configured to transmit and receive information through a wireless network to and from at least one Internet-accessible website; and, a communication interface including at least a short range wireless interface. The telematics device is further configured to communicate with at least one access device or sensor other than the diagnostic system and the position-locating system, and the communication interface is configured to universally interface with a plurality of access devices or sensors.

U.S. Pat. No. 8,019,501—Vehicle Diagnostic and Prognostic Methods and Systems

Method for predicting failures in vehicular components includes mounting sensors on the vehicle which provide data affected by the operation of the components, obtaining data from the sensors, detecting patterns in the obtained data on the vehicle, analyzing the detected patterns to predict failure of any component, and informing the user, owner, dealer and/or manufacturer of the vehicle about the predicted failure to enable preventative and corrective action to be taken. A vehicle with remote telematics capability includes sensors arranged to provide data about conditions of the vehicle or components, a processor for receiving data provided by the sensors and converting the data into an output constituting a signal about a diagnostic condition of the vehicle or component(s), and a communications unit arranged to transmit the signal. The communications unit can establish a communications channel with a dealer or manufacturer of the vehicle at a location remote from the vehicle.

U.S. Pat. No. 8,190,322—Autonomous Vehicle Maintenance and Repair System

A system and method for providing autonomous and remote vehicle maintenance and repair. The system employs an on-board diagnosis and prognosis module that monitors one or more vehicle buses to identify trouble codes and other information indicating a vehicle problem. The on-board module causes a telematic device on the vehicle to broadcast a message including a problem code that identifies the problem the vehicle is having. A remote repair center may receive the message and may identify a software upgrade patch associated with the problem that can be transmitted to the vehicle to upgrade its software to correct the problem. Also, the message may be received by another vehicle that is part of a broadcast network that has previously received the software upgrade patch to fix a problem on that vehicle, where the receiving vehicle may transmit the software upgrade patch to the vehicle having the problem.

U.S. Pat. No. 8,285,439—System and Method for Performing Vehicle Diagnostics

One aspect includes a system for monitoring a vehicle's health status. The system comprises a vehicle monitoring computer system configured to (1) receive information associating a cell phone with a vehicle, (2) receive vehicle diagnostic information including vehicle conditions, (3) automatically determine a severity status for the vehicle conditions based on pre-defined severity status values, and (4) if the severity status for any vehicle condition exceeds a pre-defined severity threshold value, automatically transmit a text message to the cellular telephone. Another aspect includes a system for detecting and monitoring a vehicle's health status. The system comprises (1) a vehicle monitoring computer system and (2) a vehicle computer system configured to communicate wirelessly with a cellular telephone located within a vehicle or its vicinity to transmit diagnostic information to a telecommunications network for communication with the vehicle monitoring system.

U.S. Pat. No. 9,224,249—Peripheral Access Devices and Sensors for Use with Vehicle Telematics Devices and Systems A telematics method and system includes, and uses, a telematics device with a controller in communication with a diagnostic system configured to receive diagnostic information from a host vehicle; a position-locating system configured to determine location information of the host vehicle; a wireless transceiver configured to transmit and receive information through a wireless network to and from at least one Internet-accessible website; and, a communication interface including at least a short range wireless interface link. The telematics device may be embodied in an access device, which may include the position-locating system. The access device may be a smartphone, or similar device, that retrieves/transmits diagnostic data/information, and other data/information to/from the vehicle via the short range wireless link. The access device performs various telematics device functions; it uses a long range wireless interface to communicate diagnostic and related information to a central host computer, and to receive related information from same.

U.S. Pat. No. 9,384,599—Handheld Automotive Diagnostic Tool with VIN Decoder and Communication System Provided is a method of receiving data from a vehicle having an onboard computer. The vehicle identification data location on the vehicle is optically scanned and matched to a second protocol database to identify the specific protocol useful for retrieving desired diagnostic data from the vehicle. A diagnostic device is connected to the vehicle onboard computer and polls the onboard computer to identify a protocol useful to establish a communication link between the diagnostic device and the onboard computer. Once the communication link is established, the diagnostic device is configured communicate an information request to the onboard computer in the specific protocol(s) associated with vehicle identification data. The diagnostic data received from the onboard computer may then be communicated to a remote diagnostic database, via a cellphone, to identify a possible vehicle fix(es) for defects associated with the received diagnostic data.

U.S. Pat. No. 9,513,789—Vehicle Diagnostic Systems and Methods

A system for diagnosing and repairing vehicles is provided. An example apparatus includes a vehicle interface configured to transmit one or more instructions to an adaptor connected to a vehicle and retrieve an indication of one or more diagnostic trouble codes from the adaptor. The apparatus includes a communication module configured to transmit the diagnostic trouble codes to a remote server along with a user identifier or a vehicle identification number, and receive repair information from the remote server. The apparatus further includes a user interface configured to receive user requests for information and to display information regarding the adaptor, the vehicle information, the one or more diagnostic trouble codes, and/or the repair information. Finally, the apparatus includes a memory and a processor configured to control the vehicle interface, the communication module, the user interface, and the memory.

US Application No. 20100042287—Proactive Vehicle System Management and Maintenance by Using Diagnostic and Prognostic Information A system and method for providing proactive vehicle system management and maintenance using diagnostic and prognostic information. Vehicle information is collected from vehicle sensors and/or sub-systems by an on-board module on the vehicle and/or at a remote facility where the information is wirelessly transmitted to the remote facility. The collected information is analyzed to determine the health of various systems, sub-systems and components so that the remaining useful life of the systems, sub-systems and components can be predicted. By utilizing the diagnostic and prognostic information, a vehicle control strategy can be reconfigured to minimize customer impact. Further, if a software problem is detected, temporary or permanent software fixes can be provided automatically and remotely through a remote service garage.

Oftentimes, a malfunction may result from the failure of a particular component that may be easily removed and replaced. Once the diagnosis is made, the manufacturer can simply send the part directly to the customer via overnight shipping, courier, or the like, and further, may communicate directly with the customer, the brush cutter operator, or the customer's mechanic/technician and explain how to replace the faulty component.

This concept of repairing the machine in the field may not be feasible for major repairs, but minor repairs constitute a significant percentage of malfunctions and warranty work, and in such cases, this process dramatically reduces the time to make the repairs, eliminates the effort of delivering the machine to the dealership, and further, from the manufacturer's point of view, eliminates the labor costs of the mechanics in the dealership service department. Essentially, this system may be used to 'remove the middle man,' which is the dealership, and save both time and money in the process. Additionally, even if the breakdown of the machine does require a major repair effort by a qualified technician, the ability to diagnose the problem remotely is advantageous because 1) in some cases, the manufacturer may be able to send a qualified technician out to the job site with the appropriate replacement parts, or 2) if the machine simply cannot be fixed in the field, then the customer knows that delivering the machine to a repair facility is not a wasted or unnecessary step, as all other options have been exhausted. Thus, the present system dramatically reduces the number of times a machine must be removed from the job site for repairs, and eliminates time and expense of hauling the machine to a repair facility (thereby losing several days or weeks of use) due to an easily repairable problem.

BRIEF SUMMARY OF THE INVENTION

In accordance with one aspect of the invention, a first embodiment of a system for remotely monitoring and diagnosing equipment malfunctions includes, broadly, a sensor array that is operatively attached to an on-board computer or computing device. The computing device gathers information from the sensor array in real time and continuously displays the results and measurements of the various sensors. A communications module is operatively connected to the on-board computer, and is used to transmit the information gathered by the sensors to another computing device at a remote location, which is typically a technical support facility manned and operated by technicians who are qualified to monitor the performance of the various systems, use the information to diagnose problems and malfunctions, and provide solutions to fix the problems and malfunctions. Hereinafter, the aforementioned technical support facility shall be referred to herein as "mission control."

Generally, the systems that are monitored on the heavy equipment include mechanical systems, electrical systems, hydraulic systems, computer hardware and software. Additionally, other types of information may be monitored, as well, such as location information and tracking (GPS), temperature and weather conditions, fuel and oil levels, and the like. For most sensors, normal parameters and performance characteristic ranges are established, and if any sensor detects that the performance characteristics fall outside of the range of the established normal parameters, then an alert or notification may be displayed on the on-board computer, and may further be transmitted to mission control. In addition to the communications between the on-board computer and the computers at mission control, the system may also provide audio/video communications between the operator of the heavy machinery and the technicians at mission control, so that they may discuss the malfunctions or performance problems in real time, while reviewing the data provided by the sensors and displayed on the on-board computer monitor and the mission control computers.

This arrangement is similar to the methods used by NASA, wherein the spacecraft (in the present case, a piece of heavy machinery) is monitored remotely by technical support staff at mission control on Earth. If problems arise with the spacecraft, then the mission control technicians review the performance of various systems to diagnose the problem, isolate the component or components that are malfunctioning, and develop solutions to solve the problem and restore the system to working order, with the technicians and astronauts discussing repairs via video conference. In the present case, however, after diagnosing the problem and identifying any parts or components that must be replaced, the manufacturer may ship the parts to the customer, and further, may send a technician to the field or job site for more complicated repair work.

BRIEF DESCRIPTION OF THE DRAWINGS

These and other features, aspects, and advantages of the present invention will become better understood with regard to the following description, appended claims, and accompanying drawings where:

FIG. 1 is a flowchart illustrating the basic steps of the present system, including identifying a problem or malfunction at a job site, remotely developing a solution at a service hub monitoring facility ("mission control"), and shipping parts from the manufacturer directly to the customer at the job site for repair;

FIG. 2 is an illustration of a screen shot from software showing various on-board systems of a machine being monitored and displayed both on an onboard computing device and on a computing device at mission control.

DETAILED DESCRIPTION OF THE INVENTION

Overview

Figure 2:
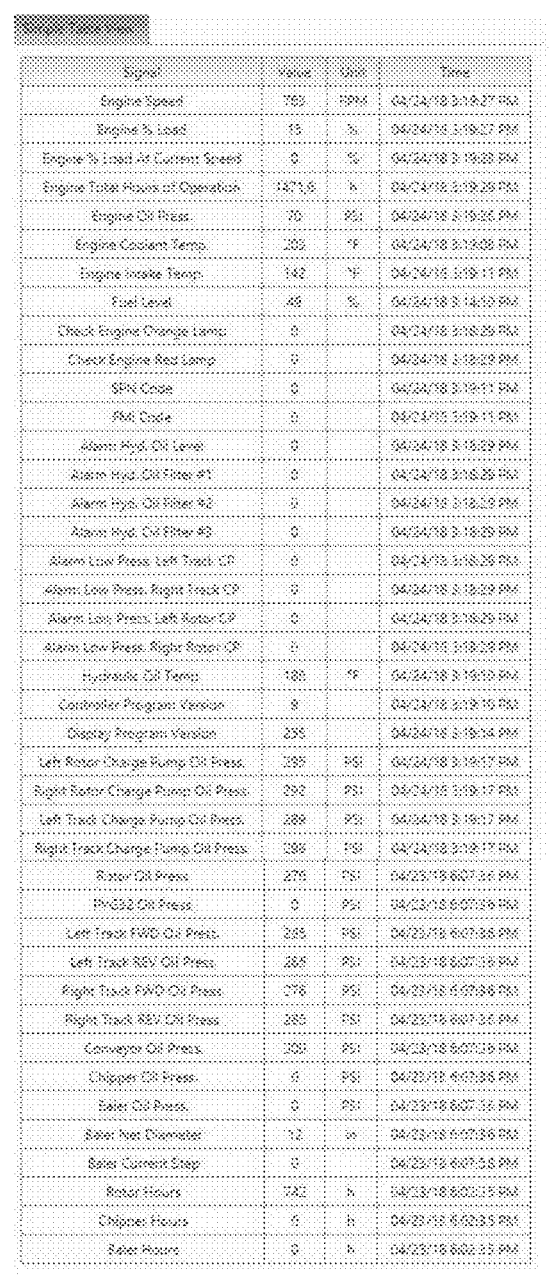
Figure 3:
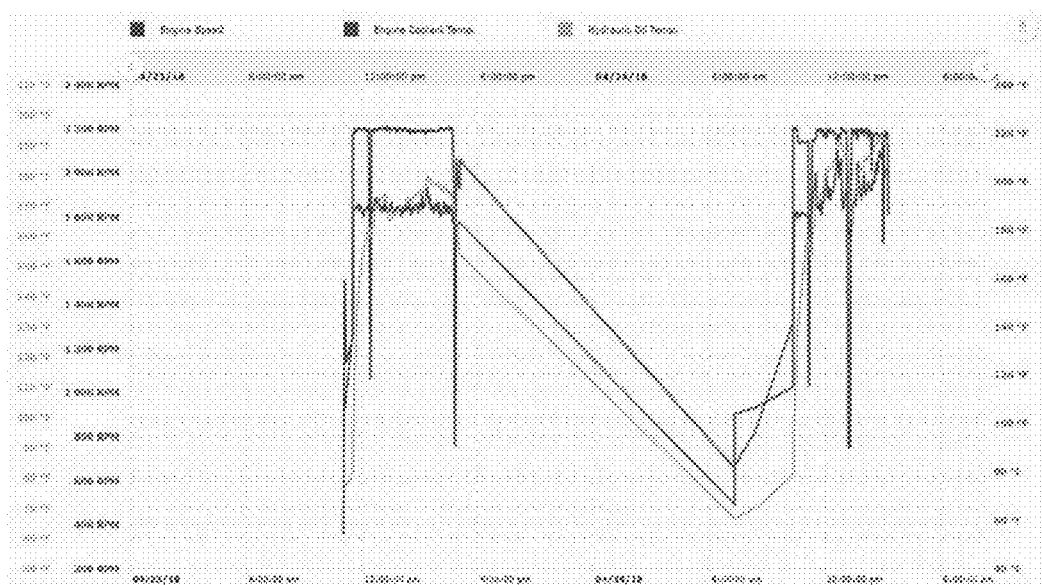
FIG. 3 is an illustration of a screen shot showing a graph of various systems being monitored and displayed both on an onboard computing device and on a computing device at mission control.

The present invention includes a system for remotely monitoring various components and performance characteristics of mobile, heavy equipment, and further, for remotely diagnosing problems and malfunctions of such equipment, as shown in FIGS. 1 and 2. The present system is described herein as being attached to a brush cutter, which is a vehicle having a pair of tracks, a cab where an operator sits while operating the brush cutter, and a hydraulically actuated brush cutter head for cutting trees, logs, brush and the like. It should be understood, however, that the present remote diagnostics and monitoring system may be applied to any heavy mobile equipment, and the phrase "heavy mobile equipment unit" is defined herein to include large industrial equipment such as backhoes, track hoes, tractors, excavators, skid steers, bulldozers, and the like (also referred to herein as "heavy machinery" or "heavy mobile equipment"). The system includes an on-board sensor array operatively connected to an on-board computing device that includes a display, so that an operator may monitor the sensor data in real-time. The on-board computing device either includes or is operatively connected to a communications module for wireless communications with another computing device at a "mission control" facility, which is monitored and manned by qualified technicians. Typically, the mission control facility is run by the manufacturer of the heavy equipment, and the technicians are trained to monitor the sensor data, diagnose problems and malfunctions, and offer solutions to the operator/customer in the field or at a job site. The system preferably also includes audio/video communications between the heavy machinery and mission control, so that an operator may talk directly to a technician at mission control about a problem or malfunction, and so that they can collaborate on restoring the machinery to working order.

As discussed herein, the system is described as being a part of a brush cutter, which is essentially a large vehicle having a rotating drum on a front end thereof, wherein the rotating drum has cutting teeth for mulching trees and brush, and is mounted on a pair of hydraulically controlled arms that may be raised and lowered. An example of a brush cutter is the GT-35 XP, which is commercially sold by the Gyro-Trac Corporation. It should be understood, however, that the present system may be employed on any type of heavy mobile equipment used for earth moving, construction, demolition, or the like.

Sensor Array

In a first embodiment, a brush cutter includes a sensor array for monitoring the performance of various systems, broadly including electrical systems, mechanical systems, computer hardware and software, and hydraulic systems. The sensors are used to provide real-time data for oil temperature, engine speed, coolant temperature, fuel and oil levels, engine hours, and the like. An example of information gathered by the sensor array is illustrated in FIGS. 3 and 4.

The sensor array is operatively connected to an on-board computing device, which may take the form of a computer, tablet, smart-phone, or any other suitable computing device. In a preferred embodiment, a smart tablet, such as an iPad, is used, and includes a dedicated software application, or "app," to compile and display the sensor data. For some types of sensor data, normal operating parameters may be established, so that if any sensor data is measured outside of the normal parameters, then an alert or notification is issued. For critical warnings (such as extremely high engine temperatures or extremely low oil pressure), the computing device may be programmed to shut down the engine or system that is in danger of overheating or malfunctioning, in order to prevent or reduce any resulting damage.

The system may also include GPS sensors to provide real-time location data, as well as time-stamped tracking data, speed, direction, and the like. The GPS data may be displayed both on the on-board tablet and on computing devices at mission control. Other types of sensors may be used, as well, including outdoor temperature sensors (particularly useful in extremely cold or hot environments), tire inflation sensors, climate control sensors, cameras, proximity sensors, and any other suitable or desirable sensors.

On-Board Computing Device

As stated previously, the on-board computing device may take any suitable form, including a built-in computer, a removable laptop, touchscreen, tablet, smart phone, or the like. In a preferred embodiment, a tablet, such as an Apple iPad or Microsoft Surface is used as the computing device, and a docking station may be provided, so that the tablet is removably connected to the system. The docking station preferably supplies power to the tablet, and further, may provide a wired connection to the rest of the system, potentially including a communications module, the sensors, and any other parts of the machine. Alternatively, the tablet may be operatively connected to the on-board systems wirelessly through wifi, Bluetooth, or any other suitable wireless communications technology. It should be understood that the tablet may communicate both wirelessly and through a wired connection to the on-board systems, and may communicate either way with mission control, as well. The communications module may be capable of communicating through any suitable manner, including through mobile telephone networks, satellite communications, radio communications, or the like.

In use, the on-board computing device continuously receives sensor data from the sensors, and displays it for the operator. The software app on the tablet is used to coordinate the gathering of sensor data, and the transmission of that data through the communications module (or through the internal communications functions of the tablet itself) to the remote computing devices at mission control. Additionally, the software app may include audio/video communications capabilities, allowing the operator to communicate directly with mission control, similarly to Apple's popular FaceTime application.

Because the tablet is preferably removable from the docking station, the operator may disconnect and use the tablet to take pictures and/or video of problematic components, and that information may be sent to mission control to help the technicians diagnose problems and malfunctions. For instance, when a malfunction arises, the operator may initiate a video conference with a technician at mission control (or the technician may also initiate the video conference). As part of this discussion, the technician may ask the operator to remove the tablet from the docking station and point the camera at a particular component or part of the machine, so that the technician may view it in real time. Optionally, the software app may also be loaded onto a smart phone or second tablet and operatively connected to the on-board computing device and mission control computing device(s), which allows the operator to keep the on-board tablet connected while using the second device for video conferencing, and the like.

The system is also capable of wirelessly updating on-board software, either for the app, or for other software that is used to monitor or run the machine. Additionally, if a malfunction is determined to be caused by software, the technician at mission control can reboot, reinstall, or otherwise patch or repair the software remotely from mission control by transmitting the updates, patches or uncorrupted code from mission control directly to the on-board computing device.

Mission Control

In one embodiment, mission control is a centralized facility manned by technicians who are qualified to remotely monitor the brush cutter (or other heavy equipment), diagnose problems, isolate malfunctioning components, and offer repair solutions. A number of computing devices are located at the facility, and each computing device is capable of monitoring multiple machines located anywhere in the world. Machines may be identified by serial number, customer, or any other identifying information, and may be displayed on a map, which shows the location of each machine, its location, prior path (GPS tracking) and current status (idle or operational). A technician may select any particular machine, which then shows a menu with various options to choose from. Sensor information gathered by the on-board sensors may be displayed, so that the technician has access to the same information being displayed by the on-board computing device or tablet.

Preferably, once a problem is discovered and the operator begins to communicate with a technician, then that specific technician is tasked with following through with that specific operator to solve that specific problem, so that the operator is only dealing with one technician. In this way, the technician takes ownership of the operator's problem, which avoids the problem of the operator having to explain the problem multiple times, or having to work with many different technicians.

It should be understood that the computing devices at mission control may be linked together in a network configuration, and the system may include one or more servers for recording data and information collected from the fleet of heavy mobile equipment units that are dispersed throughout the country or the world. The servers are capable of communicating with both the mission control computing devices and the remote onboard computing devices, and may be used to coordinate and communicate the periodic software updates to the remote onboard computing devices and the mission control computing devices. The servers may also provide other services to the network, as is well-known in the art of networking multiple computers, which may be networked through physical data lines or may be networked wirelessly, in any desired combination.

The computing devices at mission control may also include inventory information, particularly with respect to parts, so that once the problem with a machine has been diagnosed and replacement parts selected for the repair job, the technician can see whether the part is currently in inventory. If so, then the technician can select those parts to be express shipped to the operator/customer for repair of the machine at the job site. If necessary, a technician may be sent to perform the repairs. Otherwise, the repairs may be made by an operator or mechanic employed by the customer at the job site.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A remote diagnostics and monitoring system for a heavy mobile equipment unit, said system comprising:

a computing device onboard said heavy mobile equipment unit, said computing device including a video screen, at least one speaker, a microphone, a camera and a transmitter and receiver capable of sending and receiving data communications and audio/video communications;

a sensor array deployed about said heavy mobile equipment unit to monitor component systems and mechanical performance of said heavy mobile equipment unit, said sensor array operationally connected to said onboard computing device so that said computing device displays data gathered by said sensor array on said video screen;

a remote computing device that is monitored by a technician in real time in a remote location, said remote computing device including a video screen, at least one speaker, a microphone, a camera and a transmitter and receiver capable of sending and receiving data communications and audio/video communications with said onboard computing device, wherein said remote computing device receives real-time data from said onboard computing device;

wherein said onboard computing device and said remote computing device provide real-time audio and video communications between a user of said heavy mobile equipment unit and said remotely located technician; and wherein said onboard computing device and said remote computing device are programmed with parameters for acceptable performance by said component systems, and are further programmed to trigger an alert notification on said video screens of said onboard computing device and said remote computing device if any sensors within said sensor array detect performance outside of said acceptable performance parameters.

2. The remote diagnostics and monitoring system set forth in claim 1, wherein said sensor array includes sensors selected from the group consisting of temperature sensors, fuel level sensors, lubricant level sensors, hydraulic pressure sensors, electrical fault sensors, engine revolution sensors, oil pressure sensors, and hydraulic fluid level sensors.

3. The remote diagnostics and monitoring system set forth in claim 1, wherein said onboard computing device includes a GPS unit for detecting location of said heavy mobile equipment unit.

4. The remote diagnostics and monitoring system set forth in claim 1, (Original) further including an onboard docking station for said on-board computing device, and wherein said onboard computing device is removable from said docking station, and wherein said onboard computing device may receive data from said sensor array and may communicate with said remote computing device while said onboard computing device is separated from said onboard docking station.

5. The remote diagnostics and monitoring system set forth in claim 1, wherein said remote computing device is wirelessly and operatively connected to multiple on-board computing devices on different heavy mobile equipment units in different locations.

6. The remote diagnostics and monitoring system set forth in claim 1, wherein said onboard computing device and said remote computing device are operatively connected to a server, so that said server receives data from said sensor array, records said data from said sensor array, and communicates with said onboard computing device and said remote computing device.

7. The remote diagnostics and monitoring system set forth in claim 1, wherein said component systems include component systems selected from the group consisting of electrical systems, hydraulic systems, engine systems, location and positioning systems, lubrication systems, fuel systems, and any combination thereof.

8. A method of remotely monitoring, maintaining and repairing multiple heavy mobile equipment units, said method comprising the steps of:
providing a heavy mobile equipment unit having a sensor array including multiple sensors for monitoring component systems, and further including an onboard computing device that includes a video screen, at least one speaker, a microphone, a camera and a transmitter and receiver capable of sending and receiving data communications and real-time audio/video communications, wherein said onboard computing device receives real-time data from said sensor array;
providing remote computing device including a video screen, at least one speaker, a microphone, a camera and a transmitter and receiver for sending and receiving data communications and audio/video communications with said onboard computing device providing real-time audio/video communications between a user of said heavy mobile equipment unit and a technician monitoring said remote computing device so that said user and said technician see and hear one another in real time, wherein said remote computing device receives real-time data from said onboard computing device;
programming said onboard computing device and said remote computing device with parameters for acceptable performance by said component systems, and programming said onboard computing device and said remote computing device to trigger an alert notification on said video screens of said onboard computing device and said remote computing device if any sensors within said sensor array detect performance outside of said acceptable performance parameters;
having a technician monitor said remote computing device to detect said alert notifications;
having said technician communicate with a user of said heavy mobile equipment unit using audio and video communications between said remote computing device and said onboard computing device to determine a course of action to repair said component system that is operating outside of said acceptable parameters.

9. The method of remotely monitoring, maintaining and repairing multiple heavy mobile equipment units set forth in claim 8, further including the steps of:
providing additional heavy mobile equipment units, each having a sensor array including multiple sensors for monitoring component systems, and further including an onboard computing device that includes a video screen, at least one speaker, a microphone, a camera and a transmitter and receiver capable of sending and receiving data communications and audio/video communications with said onboard computing device, wherein said remote computing device receives real-time data from said onboard computing device; and
programming said remote computing device to monitor, receive data from and communicate with said additional heavy mobile equipment units.

10. The method of remotely monitoring, maintaining and repairing multiple heavy mobile equipment units set forth in claim 8, further including the steps of:
having said technician determine if any of said component systems of said heavy mobile equipment unit requires a new part; and
using said remote computing device to arrange shipment of said new part to a location where said heavy mobile equipment is located.

11. The method of remotely monitoring, maintaining and repairing multiple heavy mobile equipment units set forth in claim 10, further including the steps of:
having said technician determine whether said new part will require a mechanic to install said new part onto said heavy mobile equipment unit; and
using said remote computing device to arrange for a mechanic to travel to said location where said heavy mobile equipment is located in order to install said new part.

12. The method of remotely monitoring, maintaining and repairing multiple heavy mobile equipment units set forth in claim 8, further including the steps of:
providing a docking station on said heavy mobile equipment unit for removably receiving said onboard computing device.

13. The method of remotely monitoring, maintaining and repairing multiple heavy mobile equipment units set forth in claim 12, further including the steps of:
having said user of said heavy mobile equipment unit remove said onboard computing device from said docking station and use said computing device to take and send a video and/or a picture of portions of any said component system to said remote computing device for inspection by said technician.

14. The method of remotely monitoring, maintaining and repairing multiple heavy mobile equipment units set forth in claim 8, further including the steps of:
using said remote computing device to send software updates or software patches to said onboard computing device.

15. The method of remotely monitoring, maintaining and repairing multiple heavy mobile equipment units set forth in claim 8, wherein said sensor array includes sensors selected from the group consisting of temperature sensors, fuel level sensors, lubricant level sensors, hydraulic pressure sensors, electrical fault sensors, engine revolution sensors, oil pressure sensors, and hydraulic fluid level sensors.

16. The method of remotely monitoring, maintaining and repairing multiple heavy mobile equipment units set forth in claim 8, wherein said onboard computing device includes a GPS unit for detecting location of said heavy mobile equipment unit.

17. The method of remotely monitoring, maintaining and repairing multiple heavy mobile equipment units set forth in claim 8, further including the step of operatively connecting said onboard computing device and said remote computing device to a server, so that said server receives data from said sensor array, records said data from said sensor array, and communicates with said onboard computing device and said remote computing device.

18. The method of remotely monitoring, maintaining and repairing multiple heavy mobile equipment units set forth in claim 8, wherein said component systems include component systems selected from the group consisting of electrical systems, hydraulic systems, engine systems, location and positioning systems, lubrication systems, fuel systems, and any combination thereof.

* * * * *